Sept. 26, 1950     C. E. BARKALOW ET AL     2,523,270
ATTITUDE GYROSCOPE
Filed June 16, 1944     2 Sheets-Sheet 1
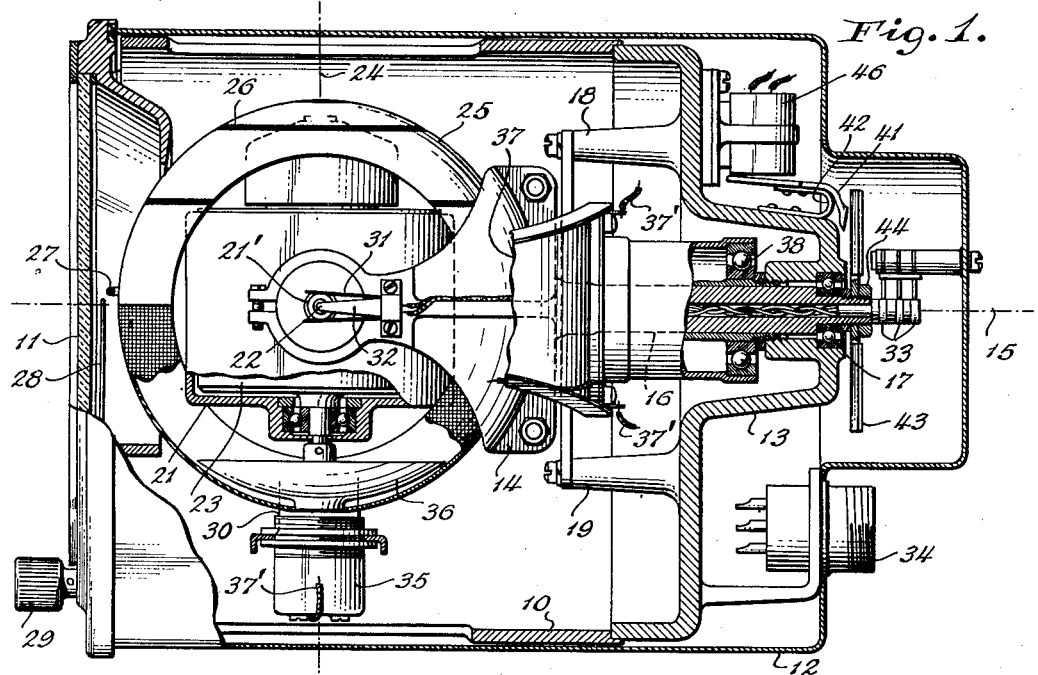
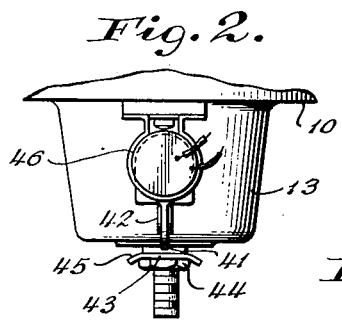
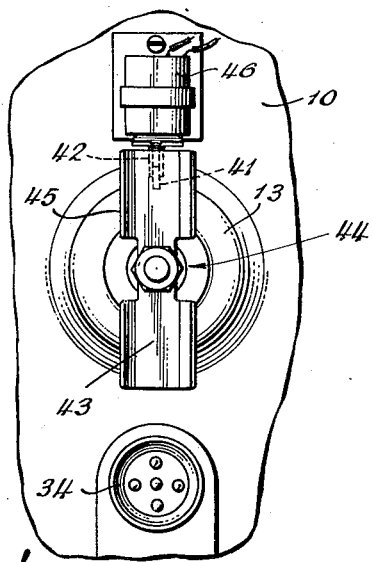
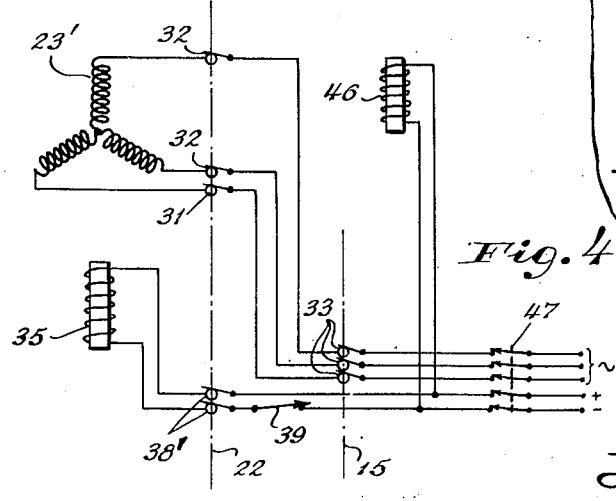
INVENTORS
CLARE E. BARKALOW
ROBERT HASKINS, JR.
BY
Herbert A. Thompson
ATTORNEY

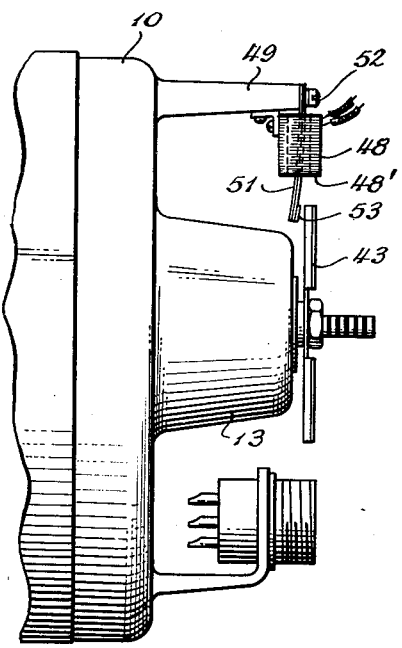
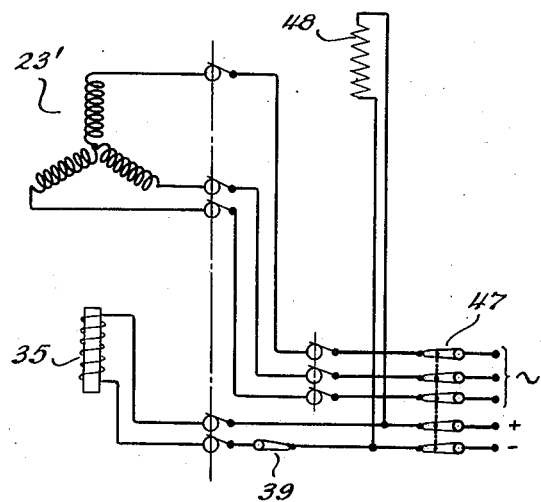
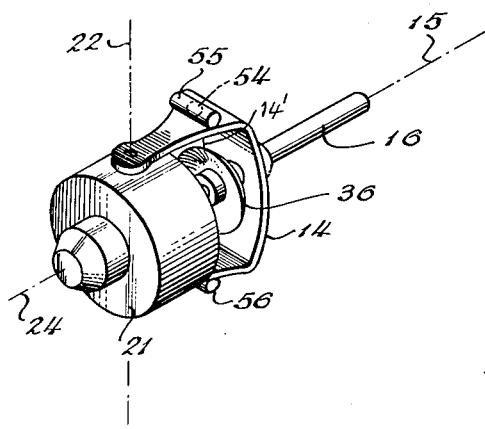
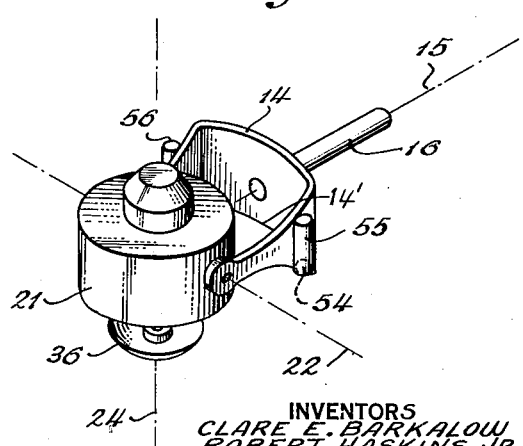

Patented Sept. 26, 1950

2,523,270

UNITED STATES PATENT OFFICE 2,523,270

ATTITUDE GYROSCOPE

Clare E. Barkalow, Floral Park, N. Y., and Robert Haskins, Jr., Rutherfordton, N. C., assignors to The Sperry Corporation, a corporation of Delaware Application June 16, 1944, Serial No. 540,650

6 Claims. (Cl. 74—5.1)

The present invention relates generally to gyroscopic instruments for use on aircraft, and has reference more particularly to an attitude type of gyro instrument wherein an indication of the craft's attitude or position in pitch and roll is continuously provided. The present invention has reference also to a locking mechanism for such instruments. Such an instrument is particularly adapted for use on craft such as military planes which perform intricate maneuvers.

In the drawings and following description of our invention, we have illustrated and described a preferred embodiment thereof as comprising an attitude gyro; but, in its broader aspects, our invention may comprise any type of gyro which is subject to gimbal locking upon deenergization thereof. In furtherance of a more complete understanding of the following discussion relative to the torques causing gimbal lock to occur, it may be here briefly pointed out that an attitude gyro comprises a rotor bearing case within which the gyro rotor spins normally about a vertical axis. The rotor bearing case is rotatably supported on trunnions in a gimbal ring which in normal operation of the instrument lies in horizontal planes and which, in turn, is supported in the case of the instrument to pivot about an axis preferably aligned or parallel with the fore and aft axis of the craft on which the instrument is mounted. It will be understood, of course, that our invention is applicable to a gyroscopic instrument whose gimbal axis may be aligned with other axes of the craft, such as, for example, the athwartship axis. However, in the following description we will refer to the former case wherein the gimbal pivotal axis is aligned with the fore and aft axis of the craft.

With instruments of this type, it has been found that under conditions that very often exist when the power is turned off, the gyro rotor bearing case will precess into a gimbal lock position, that is, into a position wherein the rotor spin axis parallels the gimbal pivot axis. The rotor case is caused to precess into a gimbal lock position by a torque produced by the decelerating rotor. For example, when the pivotal axis of support of the gimbal ring does not lie perpendicular to the spin axis of the gyro rotor and the gyro spinning-power is cut off, the torque produced by the decelerating rotor may be resolved into components, one of which occurs about the axis of the gimbal ring, thereby causing the rotor case to precess toward gimbal lock position.

Let the torque produced by the deceleration of the rotor be represented by a vector T which lies along the spin axis of the gyro rotor. When the spin axis is perpendicular to the fore and aft axis of the gimbal, the torque vector T is also perpendicular to the gimbal axis, and there will be no component of torque about said gimbal axis. However, if the fore and aft gimbal axis is not perpendicular to the spin axis, the torque vector will be inclined at an acute angle with respect to the fore and aft axis, and may now be resolved into two components, component $T_x$, lying in a horizontal plane and component $T_y$, lying in a vertical plane.

The $T_x$ component lies in a direction parallel to the fore and aft axis of the gimbal and the $T_y$ component in a direction perpendicular thereto. The component $T_y$ is annulled by the reaction forces set up in the bearings in which the trunnion of the gimbal ring is journaled, but the $T_x$ component is an effective torque about the fore and aft gimbal axis, causing precession of the rotor bearing case toward gimbal lock. Since the gimbal ring also precesses or rotates under this effective torque, it may assume a vertical position with the spin axis of the gyro rotor and the gimbal axis aligned, when a gimbal lock condition obtains. The value of the $T_x$ component may be expressed as $$T_x = T \cos a$$

where $a$ is the acute angle between the spin axis and the fore and aft axis of the gimbal and T the total torque along the spin axis of the rotor.

As an example, suppose this instrument be mounted in an airplane and it is coming in for a landing. The pilot busies himself with getting his ship on the ground, turning off the power to his instruments after he has landed. When the ship comes to rest, it assumes a position, for most types of craft, wherein the plane's fore and aft axis is at an angle to the horizontal. Usually this angle lies in the range of from 10° to 20°, and therefore the gimbal axis of the attitude gyro will also lie at this angle to the horizontal. When the instrument is turned off, the spin axis of the rotor will be in a vertical position but will lie at an angle to the fore and aft gimbal axis.

The torques produced by the decelerating gyro rotor will precess the gimbal ring into a vertical position and the rotor bearing case into a position where the spin axis is aligned with the gimbal axis. If the instrument is started again while the rotor is still spinning its bearing case will nutate violently and assume any position such as upside down or lying on its side and any erection system which is employed will take a long time in precessing it to its normal vertical position.

In order to prevent the precession of the gimbal ring and rotor bearing case into a gimbal lock position upon deenergization of the instrument, we propose to maintain the gimbal ring in its normal horizontal plane relative to the horizontal plane of the craft and thereby effectively cancel the torque component $T_x$ explained above.

It is, therefore, an object of the present invention to provide a gyroscopic instrument comprising means for preventing the gyro rotor case from precessing into a gimbal lock position upon deenergization of the instrument.

It is another object of the invention to provide means for preventing or restraining pivotal movement of the gimbal ring of a gyroscopic instrument about its axis of support when the instrument is shut off to effectively prevent the instrument from going into a gimbal lock position.

Still another object of the invention resides in providing means adapted to frictionally engage the gimbal ring of a gyroscopic instrument, thereby preventing precession into gimbal lock, when the instrument is deenergized.

A further object of the invention is to provide in a gyroscopic instrument, electrically controlled means which, when deenergized, will resist pivotal movement of the gimbal ring and thereby prevent the instrument from assuming a gimbal lock position.

With these and other objects and advantages in view, the invention includes the novel correlation and combination of elements described in the following detailed description of the same and illustrated in the accompanying drawings, wherein:

Fig. 1 is a longitudinal elevational view shown partly in section of a gyroscopic instrument on which the invention may effectively be employed.

Fig. 2 is a plan elevational view of a part of the instrument shown in Fig. 1, showing the relative position of the elements of our invention.

Fig. 3 is a partial end view of the instrument with its outer cover removed.

Fig. 4 is an electrical wiring diagram of the instrument showing the correlation of the electrical parts.

Fig. 5 is a view similar to a portion of Fig. 1, showing a modification of our invention.

Fig. 6 is a wiring diagram similar to Fig. 4, but applied to the modification shown in Fig. 5.

Figs. 7 and 8 are schematic representations showing another modification of the present invention.

As stated above, our invention is particularly adapted for use on an aircraft gyroscopic instrument which will give an indication of the attitude of the craft throughout 360° of movement. That is, during any maneuver the craft might go through, the pilot will get a true indication of his attitude in space. Such an instrument together with its erecting means is described in the copending application of Esval, Wrigley and Haskins, Serial No. 445,760, dated June 4, 1942 for Attitude Gyros, now abandoned, and in our copending application Serial No. 496,930, filed July 31, 1943, now Patent No. 2,492,995.

Referring now to the drawings, a gyroscope of this form is shown in Figure 1. The instrument comprises generally a casing 10 adapted for installation in the instrument panel of an aircraft. The casing 10 has a window 11 in the front thereof which discloses the indicating elements of the instrument. The entire casing is enclosed with a thin metal cover 12 to protect the delicate parts of the instrument from dust, moisture, etc. The casing 10 is provided at its rearward end with a rearwardly projecting hub 13 adapted to pivotally mount the gimbal ring 14 along the longitudinal axis 15 of the instrument. The gimbal ring 14 is generally U-shaped and is provided with an elongated trunnion 16 which is supported at its one end in hub 13 by suitable bearings 17. The forward support of the gimbal trunnion 16 consists of two forwardly extending brackets 18 and 19 on the casing 10 which supports a suitable bearing member not shown. A rotor bearing case 21 provided with suitable trunnions 21' is pivotally mounted between the arms of the U-shaped gimbal 14 for movement about a horizontal axis 22 normal to trunnion axis 15. A gyro rotor 23 is mounted in rotor bearing case 21 to spin about a vertical axis 24 normal to both axes 15 and 22. Rotor bearing case 21 has mounted thereon a circular shell 25 which has on the surface thereof suitable markings 26 which when viewed through window 11 will give the pilot an indication of the attitude of his craft. These markings are read in connection with a fixed horizon bar 27 and vertically adjustable reference 28, the same being adjusted from knob 29.

Suitable means for spinning the rotor 23 of the instrument may be employed. In this case it is shown as being spun electrically; the rotor 23 forming a part of a three-phase induction motor whose stator windings 23" are shown schematically in the wiring diagram of Fig. 4. The electrical energy is supplied to the rotor through axis 22 as by hair pin member 31 and leaf spring member 32 and through axis 15 by slip ring members 33. Electrical energy is supplied through a plug 34 suitably mounted in casing 10 and through suitable leads to the various electrical parts of the instrument.

Erection of gyroscopic instruments of this character is accomplished by electromagnetic means. As shown in Fig. 1, an electromagnet 35 is universally supported in casing 10 in such a manner as to maintain a position directly under a substantially cup-shaped inductor member 36 fixedly mounted to the gyro rotor 23 and rotatable therewith. The universal mounting for said magnet member consists of a yoke 37 rotatably mounted on said casing by bearings 38 for pivotal movement about axis 15, and a bail 30 rotatably mounted on the free ends of said yoke 37 for pivotal movement about axis 22. The erection torques are produced by the interaction of the magnetic field produced by magnet 35 and the rotating inductor member 36. The functions of these two members may be more clearly understood by referring to the above-mentioned application. Direct current electrical energy is supplied to the electromagnet by way of leads 37' with appropriate slip ring members 38' at axis 22 (see Fig. 4).

The erection magnet 35 is limited in motion under the inductor member 36, and during certain maneuvers of the craft, it is desirable to render the magnet 35 unenergized, as described in detail in the above-mentioned application. As disclosed therein, when the craft has reached one of the limiting positions of the erection system, a switch 39 (see Fig. 4) is opened, thus breaking the energizing circuits of the electromagnet 35 of the erection device.

The mechanism for resisting the pivotal movement of the gimbal ring about its axis of support 15 comprises generally, an electrically controlled brake shoe member resiliently mounted on the casing of the instrument which cooperates with a drum member fixed to the gimbal of the gyro. Described in more detail with reference to Figs. 1-3, this mechanism comprises a brake shoe 41 which is suitably fastened to one arm of a U-shaped spring 42 as by rivets or the like. The other arm of spring 42 is in turn securely fastened to the hub 13 of the instrument casing 10. U-shaped spring 42 is so constructed as to exert a tensional force between the arms thereof instead of a compressional force when it is relaxed; that is, the arms tend to draw together instead of push apart. A cooperating drum 43 is securely fastened to the end of elongated trunnion 16 of the gyro gimbal 14 by means of the bolt and nut arrangement indicated at 44 so that the drum 43 turns with the gimbal 14. The configuration of the drum 43 may more clearly be seen in Figs. 2 and 3. As there shown, the drum 43 comprises a substantially rectangular piece of metal or other relatively stiff material which is attached to the gimbal trunnion 16 at its center. The edges of the long side of the rectangular brake member are shown as being flanged toward the rear of the instrument as shown at 45 for purposes that will become apparent as the description proceeds. It will be understood, of course, that the brake drum may assume any convenient shape such as circular and is not necessarily limited to a rectangular configuration.

The control means for the brake shoe 41 comprises an electromagnet 46 which is mounted to instrument casing 10 and receives its electrical energy from the same source of direct current as the erecting magnet 35. The shoe member 41 is, in effect, an armature of the magnet 46. The two magnets 35 and 46 are electrically connected in parallel (see Fig. 4) rather than in series because when the craft assumes positions beyond the limits of the erection system magnet 35 is de-energized by action of switch 39 and at this time deenergization of the magnet 46 would obviously be undesirable.

In operation, assume the instrument to be on, and the craft on the ground just after making a landing. Assume also that the fore and aft axis of the craft is not level (actually it won't be in a majority of cases). In this case, the gyro rotor casing 21 will maintain its vertical position, but the gimbal will be in line with the inclined fore and aft axis of the craft. Now, the instrument is turned off by throwing switch 47 (see Fig. 4). The energy is shut off from the rotor 23' and the erection magnet 35 and at the same time from the magnet 46. Therefore, the brake shoe 41 which forms the armature 46 is no longer held in place and is pulled away from the now deenergized magnet face by the action of spring 42 and frictionally engages the drum 43, thus preventing gimbal 14 from pivoting about its fore and aft axis 15. By preventing pivotal movement of the gimbal about this axis, the rotor casing 21 cannot precess into a gimbal lock position, as explained above. A schematic representation of a gyroscope of this character is shown in a gimbal lock position in Fig. 7.

If, for some reason, the instrument is turned off during flight and the craft was, for example, in a bank position, the brake shoe 41 will not engage the drum 43. However, at some time during deceleration of the rotor, the plane will become horizontal and the shoe 41 will ride up on the flanged edge 45 and thus restrain the gimbal 14 from further movement.

In Fig. 5 there is shown a modification of the invention. In this case, magnet 46 is replaced by a resistance coil 48 which is wound around a hollow core member 48' and is in turn mounted on an extension 49 on the casing 10 of the instrument. The brake shoe in this modification is a bimetallic element 51 adapted to freely fit through hollow core 48' and has one end securely fastened to the extension 49 as indicated at 52. To the free end of the bimetallic strip is secured a shoe piece 53 which cooperates with drum 43. When the current to the instrument is on, current to the coil 48 is also supplied and the bimetallic strip 51 is heated thereby bending it away from drum 43; however, when the current is turned off by throwing switch 47 (see Fig. 6) the bimetallic strip cools off and it straightens out allowing the shoe piece 53 to contact and frictionally engage drum 43.

A further modification is shown in Figs. 7 and 8, wherein the gimbal 14 is restrained from pivoting about axis 15 during deceleration of the rotor by making the gimbal slightly pendulous. To this end, then, there is disposed on opposite sides of the gimbal 14, two hollow cylinders 55 and 56, each with their long axis perpendicular to the gimbal axis 15. Each cylinder contains a ball 54 which is free to move therein from one end to the other. If the gimbal assumes the position shown at the end of the deceleration period, both balls will lie to one side or the other of the central position shown, thereby providing a torque due to unbalance and causing the gimbal to rotate about axis 15 until it is again horizontal. The position of ball 54 in Fig. 7 is one of unstable equilibrium and cannot be attained under normal operation. The gimbal will then always lie in the horizontal position when the rotor is started and will perform in a normal manner. The importance of this feature will be realized if it is remembered that in this type of universally mounted gyroscope having no limit stops, the gimbal ring may assume a position with either side 14 or 14' uppermost, due to gimbal lock as explained in the aforesaid application of Esval, Wrigley and Haskins. If the gimbal ring were made pendulous in the ordinary manner in one position, it would be antipendulous with the other side up. With our invention, however, the balls 54 render the gimbal pendulous when the minor axis 22 is horizontal, no matter which side 14 or 14' is up, by always displacing the center of gravity to the low side.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic instrument of the character described, an instrument casing, a gimbal ring rotatably supported in said casing to pivot about a first axis, a rotor bearing case having a gyro rotor mounted to spin therewithin and supported on said gimbal ring to pivot about a second axis, brake means for maintaining said gimbal in fixed relation to said instrument casing comprising a drum member fixedly mounted on said gimbal, an associated bimetallic shoe member fixed to said casing, electrical means for controlling the position of said bimetallic shoe member, and manually operable means for controlling the energization of said electrical means.

2. In a gyroscopic instrument of the character described, an instrument casing, a gimbal ring rotatably supported in said casing to pivot about a first axis, a rotor bearing case having a gyro rotor mounted to spin therewithin and supported on said gimbal ring to pivot about a second axis, electrical means for spinning said rotor, brake means for maintaining said gimbal in fixed relation to said instrument casing comprising a drum member fixedly mounted on said gimbal, an associated bimetallic shoe member fixed to said casing, electrical means for controlling the position of said bimetallic shoe member, and a common switch for energizing said spinning means and said electrical means.

3. In a gyroscopic instrument of the character described, an instrument casing, a gimbal ring rotatably supported in said casing to pivot about a first axis, a rotor bearing case supported in said gimbal ring to pivot about a second axis, electrical means for erecting said rotor case, braking means including a drum fixedly mounted on said gimbal ring and a brake shoe engaging with said drum mounted on said casing, electrical means for disengaging said shoe and drum, and means for simultaneously rendering said electrical erecting means and electrical brake disengaging means effective.

4. In a gyroscopic instrument of the character described, an instrument casing, a gimbal ring rotatably supported in said casing to pivot about a first axis, a rotor bearing case having a gyro rotor mounted therein supported in said gimbal ring to pivot about a second axis, electrical means for spinning said rotor, electrical means for erecting said rotor case, braking means including a drum fixedly mounted on said gimbal ring and a brake shoe engaging with said drum mounted on said casing, electrical means for disengaging said shoe and drum, and switch means settable to permit simultaneous energization of said electrical erecting means, said electrical rotor spinning means and said electrical brake disengaging means.

5. In a gyroscopic instrument of the character described, an instrument casing, a gimbal ring rotatably supported in said casing to pivot about a first axis, a rotor bearing case supported on said gimbal ring to pivot about a second axis, electrical means for erecting said rotor case, braking means including a drum fixedly mounted on said gimbal ring and a brake shoe capable of engaging said drum mounted on said casing, electrical means operable to normally disengage said shoe and drum, and means for simultaneously rendering said electrical erecting means and electrical disengaging means ineffective.

6. In a gyroscopic instrument of the character described, an instrument casing, a gimbal ring rotatably supported in said casing to pivot about a first axis, a rotor bearing case having a gyro rotor mounted therein supported on said gimbal ring to pivot about a second axis, electrical means for spinning said rotor, electrical means for erecting said rotor case, braking means including a drum fixedly mounted on said gimbal ring and a brake shoe capable of engaging said drum mounted on said casing, electrical means operable to normally disengage said shoe and drum, and means for simultaneously rendering said electrical erecting means, said electrical rotor spinning means and said electrical disengaging means ineffective.

CLARE E. BARKALOW.
ROBERT HASKINS, Jr.

REFERENCES CITED

The following references are of record in the file of this patent:

UNITED STATES PATENTS

| Number | Name | Date |
|---|---|---|
| Re. 20,701 | Gillmor | Apr. 19, 1938 |
| 1,586,525 | Henry | June 1, 1926 |
| 1,988,463 | Schenk | Jan. 22, 1935 |
| 2,175,631 | Koster | Oct. 10, 1939 |
| 2,232,537 | Kollsman | Feb. 18, 1941 |
| 2,283,720 | Brandt | May 19, 1942 |
| 2,393,413 | Jones | Jan. 22, 1946 |
| 2,428,345 | Turner | Sept. 30, 1947 |

FOREIGN PATENTS

| Number | Country | Date |
|---|---|---|
| 511,742 | Great Britain | Aug. 23, 1939 |
| 95,595 | Sweden | Mar. 2, 1939 |